(12) United States Patent
Goldstein et al.

(10) Patent No.: US 11,028,873 B2
(45) Date of Patent: Jun. 8, 2021

(54) SHAFT ASSEMBLY FOR AN ELECTRIFIED VEHICLE AND SHAFT PROVIDING METHOD

(71) Applicant: Ford Global Technologies, LLC, Dearborn, MI (US)

(72) Inventors: Cyrille Goldstein, Ferndale, MI (US); Joel Hetrick, Ann Arbor, MI (US); Edward William Haran, Northville, MI (US); Elizabeth Rose Bifano, Garden City, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 140 days.

(21) Appl. No.: 16/425,328

(22) Filed: May 29, 2019

(65) Prior Publication Data

US 2019/0277332 A1    Sep. 12, 2019

Related U.S. Application Data

(63) Continuation of application No. 15/382,854, filed on Dec. 19, 2016, now Pat. No. 10,352,351.

(51) Int. Cl.
*F16C 3/02* (2006.01)
*B29C 39/10* (2006.01)
*B29C 69/00* (2006.01)
*F16H 57/04* (2010.01)

(52) U.S. Cl.
CPC ............. *F16C 3/023* (2013.01); *B29C 39/10* (2013.01); *B29C 69/001* (2013.01); *F16C 2326/06* (2013.01); *F16H 57/043* (2013.01); *Y10S 29/029* (2013.01)

(58) Field of Classification Search
CPC ...... F16C 3/023; F16C 2326/06; B29C 39/10; B29C 69/001; Y10S 29/029; F16H 57/043; H02K 7/003; H02K 9/19; H02K 9/197
USPC .................. 464/181, 183; 264/269; 180/65.6
See application file for complete search history.

(56) References Cited

U.S. PATENT DOCUMENTS

| 4,203,044 A | 5/1980 | Linscott, Jr. |
| 4,560,012 A | 12/1985 | McNeely, Jr. |
| 5,223,757 A | 6/1993 | Staub et al. |
| 5,511,619 A | 4/1996 | Jackson |

(Continued)

FOREIGN PATENT DOCUMENTS

| DE | 102013011588 | 1/2015 |
| DE | 102014218766 | 3/2016 |

(Continued)

OTHER PUBLICATIONS

Beer et al, Mechanics of Materials, McGraw-Hill Book Company, New York, 1981, p. 585, TA405.B39. (Year: 1981).

*Primary Examiner* — Greg Binda
(74) *Attorney, Agent, or Firm* — David Kelley, Esq.; Carlson, Gaskey & Olds, P.C.

(57) ABSTRACT

An electrified vehicle assembly includes, among other things, an outer shaft that is rotatable about an axis. The outer shaft rotatably couples a motor of an electrified vehicle to a transmission component of the electrified vehicle. A shaft insert provides a conduit for a fluid and that blocks the fluid from flowing radially between the shaft insert and the outer shaft relative to the axis. The shaft insert includes a polymer-based material, a composite material, or both.

13 Claims, 5 Drawing Sheets

(56) References Cited

U.S. PATENT DOCUMENTS 6,750,572 B2    6/2004   Tornquist et al.
7,878,911 B2 *  2/2011   Horen ..................... F16C 3/02
8,025,081 B2 *  9/2011   Poskie .................... F16C 3/02
9,188,215 B2    11/2015  Tage et al.

FOREIGN PATENT DOCUMENTS

GB    2 059 546 A  *  4/1981  ................. 264/269
WO    2015132021       9/2015
WO    2015185349       12/2015

* cited by examiner

SHAFT ASSEMBLY FOR AN ELECTRIFIED VEHICLE AND SHAFT PROVIDING METHOD

CROSS-REFERENCE TO RELATED APPLICATIONS

This is a continuation of U.S. patent application Ser. No. 15/382,854, which was filed on 19 Dec. 2016 and is now U.S. Pat. No. 10,352,351. U.S. patent application Ser. No. 15/382,854 is incorporated herein by reference.

TECHNICAL FIELD

This disclosure relates generally to a shaft assembly for a motor and, more particularly, to a shaft assembly incorporating an insert that provides a fluid conduit through the motor shaft assembly.

BACKGROUND

Electrified vehicles differ from conventional motor vehicles because, among other things, electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery can be used to selectively power the electric machines and other electrical loads of the electrified vehicle. The traction battery includes a plurality of interconnected battery cells that store energy for powering these electrical loads. Components of the electrified machines contribute to the overall weight of the electrified vehicle. The electrified machines can require thermal management and lubrication.

SUMMARY

An electrified vehicle assembly according to an exemplary aspect of the present disclosure includes, among other things, an outer shaft that is rotatable about an axis. The outer shaft rotatably couples a motor of an electrified vehicle to a transmission component of the electrified vehicle. A shaft insert provides a conduit for a fluid and that blocks the fluid from flowing radially between the shaft insert and the outer shaft relative to the axis. The shaft insert includes a polymer-based material, a composite material, or both.

In another example of the foregoing electrified vehicle assembly, the shaft insert is slideably received within the outer shaft.

In another example of any of the foregoing electrified vehicle assemblies, the shaft insert is formed within the outer shaft.

In another example of any of the foregoing electrified vehicle assemblies, portions of the shaft insert are radially spaced from the outer shaft to provide at least one annular cavity between the shaft insert and the outer shaft relative to the axis.

In another example of any of the foregoing electrified vehicle assemblies, the shaft insert extends axially from a first end portion to an opposite, second end portion. The first and second end portions are radially enlarged relative to other portions of the shaft insert to provide an annular cavity between the shaft insert and the outer shaft. The annular cavity is axially between the first and second end portions.

In another example of any of the foregoing electrified vehicle assemblies, a material composition of the shaft insert has a lower density than a material composition of the outer shaft.

In another example of any of the foregoing electrified vehicle assemblies, the insert is sealed against the outer shaft.

Another example of any of the foregoing electrified vehicle assemblies includes the transmission component and the motor.

Another example of any of the foregoing electrified vehicle assemblies includes at least one vehicle drive wheel. The motor is configured to rotate the shaft to drive the at least one vehicle drive wheel through the transmission component.

In another example of any of the foregoing electrified vehicle assemblies, the outer shaft is a metal or metal alloy, and the shaft insert is a polymer-based material, a composite material, or both.

A electrified vehicle shaft providing method according to another exemplary aspect of the present disclosure includes, among other things, positioning a shaft insert within an outer shaft. The shaft insert has a fluid conduit and is configured to block fluid from communicating radially between the shaft insert and the outer shaft. The shaft insert includes a polymer-based material, a composite material, or both. The method further includes rotatably coupling together a motor of an electrified vehicle to a transmission component of an electrified vehicle using the outer shaft.

Another example of the foregoing method includes inserting the shaft insert as a molded component into the outer shaft.

Another example of any of the foregoing methods includes molding the shaft insert within outer shaft.

Another example of any of the foregoing methods radially spacing portions of the shaft insert from the outer shaft to provide at least one annular cavity between the shaft insert and the outer shaft relative to the axis.

Another example of any of the foregoing methods driving the transmission component with the outer shaft to drive at least one vehicle drive wheel of the electrified vehicle.

Another example of any of the foregoing methods rotating the outer shaft to drive the transmission component, and driving the motor to rotate the outer shaft.

In another example of any of the foregoing methods, the shaft insert extends axially from a first end portion to an opposite, second end portion, wherein the first and second end portions are radially enlarged relative to other portions of the shaft insert to provide an annular cavity between the shaft insert and the outer shaft, the annular cavity axially between the first and second end portions.

In another example of any of the foregoing methods, the outer shaft is a metal or metal alloy. Further, the shaft insert is a polymer-based material, a composite material, or both.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure is directed toward a shaft assembly for a motor. The shaft assembly incorporates an insert. The insert reduces an overall weight of the shaft assembly. The insert includes a conduit used to communicate a fluid through the shaft assembly. These and other features are discussed in greater detail in the following paragraphs of this detailed description.

Figure 1:
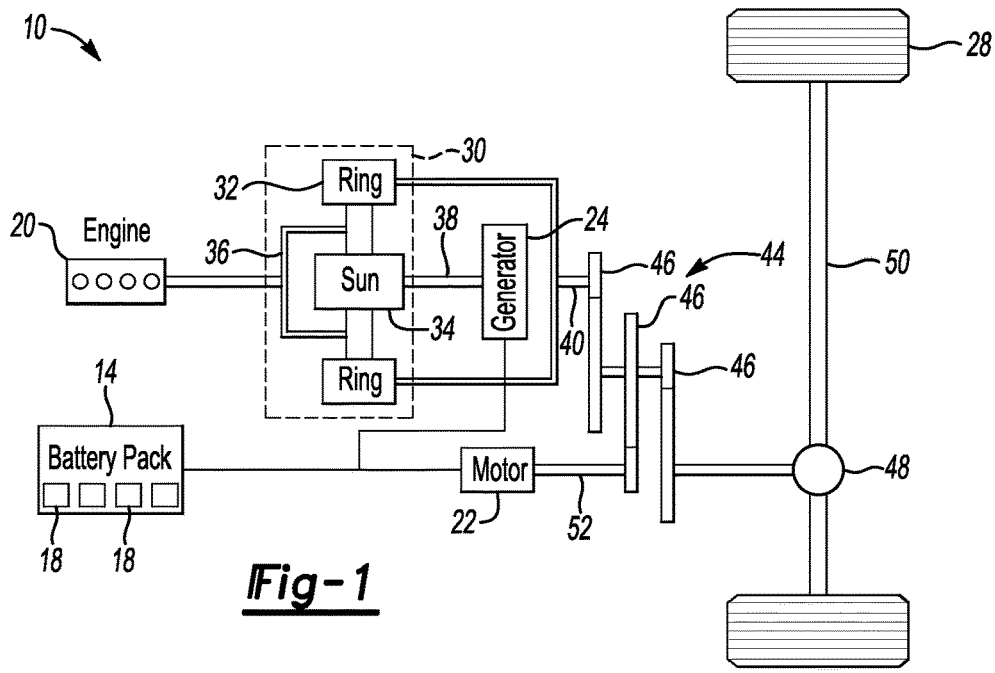
FIG. 1 illustrates a schematic view of an example powertrain for an electrified vehicle.
Figure 2:
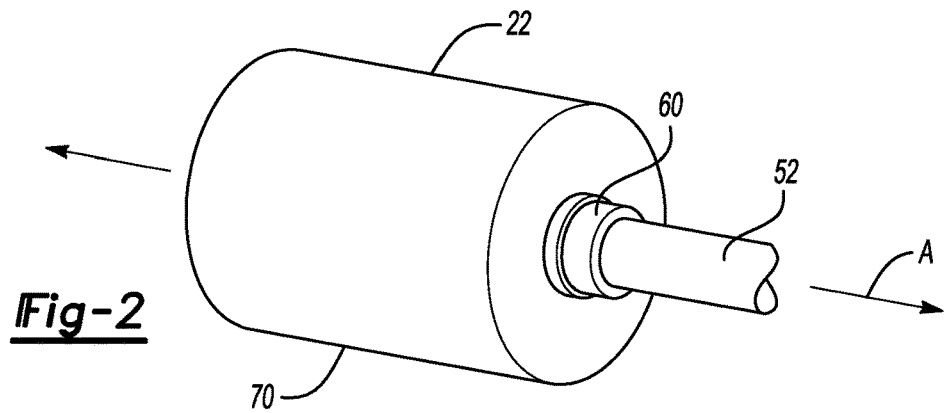
FIG. 2 illustrates a perspective view of a motor from the powertrain of FIG. 1.

FIG. 1 schematically illustrates a powertrain 10 for an electrified vehicle. Although depicted as a hybrid electric vehicle (HEV), it should be understood that the concepts described herein are not limited to HEVs and could extend to any other types of conventional vehicles and electrified vehicle, including, but not limited to, plug-in hybrid electric vehicles (PHEVs), battery electric vehicles (BEVs), etc.

The powertrain 10 of the example electrified vehicle includes a battery pack 14 having a plurality of battery arrays 18, an internal combustion engine 20, a motor 22, and a generator 24. The motor 22 and the generator 24 are types of electric machines. The motor 22 and generator 24 may be separate or have the form of a combined motor-generator. This motor 22, the generator 24, or both, can be part of a transmission for the electrified vehicle. Passageways for communicating a fluid through portions of the motor 22, the generator 24, or both, can facilitate meeting lubrication and thermal management requirements for the motor 22, the generator 24, bearings of the motor 22 and the generator 24, and other components associated with the transmission.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a power transfer unit shaft 52 that is connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

Referring now to FIGS. 2 to 5 with continuing reference to FIG. 1, the motor 22 includes a motor shaft assembly 60, a rotor 64, a stator 68, and a housing 70. The motor shaft assembly 60 is connected to the power transfer unit shaft 52. The rotor 64 is disposed within the stator 68. Portions of the motor shaft assembly 60, the rotor 64, and the stator 68 are housed within the housing 70.

Power from the battery pack 14, or from some other source, energizes the stator 68, which rotates the rotor 64 to rotate the shaft assembly 60 about an axis A. Rotation of the shaft assembly 60 rotates the power transfer unit shaft 52 to drive the second power transfer unit 44.

The rotor 64, in this example, comprises stacks of individual laminations secured to the shaft assembly 60. The laminations are steel in this example. The laminations could be compressed axially between a nut 72 and a radial flange 74 of the shaft assembly 60.

Increasing an outer diameter $D_R$ of the rotor 64 can increase a torque generated by the rotor 64 and the shaft assembly 60. Increasing the diameter $D_R$ of the rotor 64 can require increasing a diameter $D_s$ of the shaft assembly 60. Packaging requirements could also require decreasing an axial length of the shaft, which can lead to an increase in the diameter $D_R$.

In an exemplary non-limiting embodiment, the shaft assembly 60 includes an insert 76, an outer shaft 80, and a retention ring 82. The insert 76 is made of a material weighing less than a material of the outer shaft 80. The insert provides a fluid conduit 84. The insert 76 reduces an overall weight of the shaft assembly 60 when compared to a similarly sized shaft assembly that lacks any insert and provides a similarly sized fluid conduit with an outer shaft. Notably, density of the insert 76 is less than a density of the outer shaft 80.

The insert 76 is received within the outer shaft 80 of the shaft assembly 60. The retention ring 82 can prevent movement of the insert 76 relative to the outer shaft 80 and, as will be explained, provide an opening 90 and a support surface.

The insert 76 provides a fluid conduit 84. Thus, the shaft assembly 60 is considered a hollow shaft assembly. Notably, the fluid conduit 84 has a perimeter 86 provided entirely by the insert 76. That is, the fluid conduit 84 does not extend radially between the insert 76 and the outer shaft 80 such that a portion of the perimeter 86 would be provided by the outer shaft 80.

Fluid, such as a cooling fluid, a lubricating fluid, or both, can move from a fluid supply 88 to the fluid conduit 84 of the insert 76. The fluid, for example, can be used to control thermal energy levels of the motor 22 and, optionally, other components. The fluid could instead or additionally be used to lubricate components of the motor 22 and, optionally, other components.

In this exemplary embodiment, fluid moves along a path P through the opening port 90 in the retention ring 82 to the fluid conduit 84. The retention ring 82 provides a sealing interface with the fluid supply 88. The rejection ring 82 can, for example, seal against a fluid input port from the fluid supply with an o-ring type seal.

The retention ring 82 can be a metal, or metal alloy. In a specific embodiment, the retention ring 82 is an aluminum. The retention ring 82 can be press-fit into the outer shaft 80.

A first portion of the fluid that has entered the fluid conduit 84 flows through a portion of the fluid conduit 84 and then flows radially along paths PR from the fluid conduit 84. The fluid exiting the fluid conduit 84 along the radial paths PR flows along radial passageways 92 extending through the insert 76 and the outer shaft 80. Fluid flowing along the paths PR can be used to, for example, cool the laminations of the rotor 64, to cool the stator 68, or to lubricate components that move relative to each other. The example shaft assembly 60 includes two radial passageways 92 circumferentially distributed about the axis A.

A second, remaining, portion of the fluid that has entered the fluid conduit 84 flows along the entire axial length of the fluid conduit 84 and then flows along an axial path $P_A$ from the fluid conduit 84. The fluid exiting the fluid conduit 84 along the axial path $P_A$ flows along an axial passageway 94 in the power transfer unit shaft 52. The fluid exiting the fluid conduit 84 along the axial path $P_A$ could also flow along an interface between the outer shaft 80 of the shaft assembly 60 and the power transfer unit shaft 52. Fluid exiting the fluid conduit 84 along the axial path $P_A$ could, for example, cool the power transfer unit shaft 52 and support structure associated with the shaft assembly 60 or the power transfer unit shaft 52, such as bearings. Fluid exiting the fluid conduit 84 along the axial path $P_A$ could instead, or additionally be used to lubricate components that move relative to each other.

The example insert 76 is a polymer-based material, such as a resin material or a plastic material. The insert 76 could, for example, be a thermoset resin or a molded plastic, like nylon. In some examples, the insert 76 is a composite material, which could include a fibrous material. A composite material could instead, or additionally, be a material filled with additives, such as microballoons, or including pockets of injected air to facilitate decreasing a density of the insert 76. The example outer shaft 80 is a metal or metal alloy. The example retention ring 82 is aluminum or steel. The insert 76 effectively takes the place of heavier, metallic-based material. Utilizing the insert 76 can thus reduce an overall weight of the shaft assembly when compared to shaft assemblies without an insert.

Notably, a radially outer perimeter of the insert 76 contacts the outer shaft 80 along an entire axial length of the insert 76. While the insert 76 could be completely removed, and the area occupied by the insert 76 left open to reduce a weight of the shaft assembly 60, this approach would not provide the fluid conduit 84 having a relatively small cross-sectional diameter. That is, if the insert 76 were completely removed from the shaft assembly 60, fluid would need to additionally fill the area occupied by the insert 76. Much more fluid would then be required and fluid pressure could not be as closely controlled. Further, the fluid would be inhibited from flowing smoothly through the shaft assembly 60 since the relatively small cross-sectional diameter of the fluid conduit 84 within the insert 76 promotes a smooth flow of the fluid.

The retention ring 82 can provide a support surface for the shaft assembly 60. The support surface could interface with supportive bearings, for example. Providing the support surface with the retention ring 82 makes the support surface less prone to wear than if the insert 76 provided the support surface.

Further, the retention ring 82, which is made of a harder material than the insert 76 will avoid at least some wearing of a seal associated with the fluid inlet port from the fluid supply 88. That is, the seal could wear more quickly if the seal were interfacing with the insert 76 rather than the retention ring 82

Figure 5:
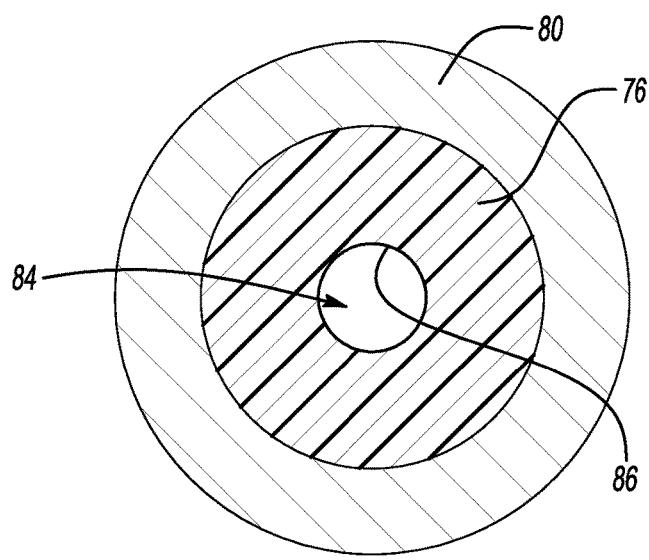
FIG. 5 illustrates a section view at line 5-5 in FIG. 4 of the shaft assembly of the motor.
Figure 6:
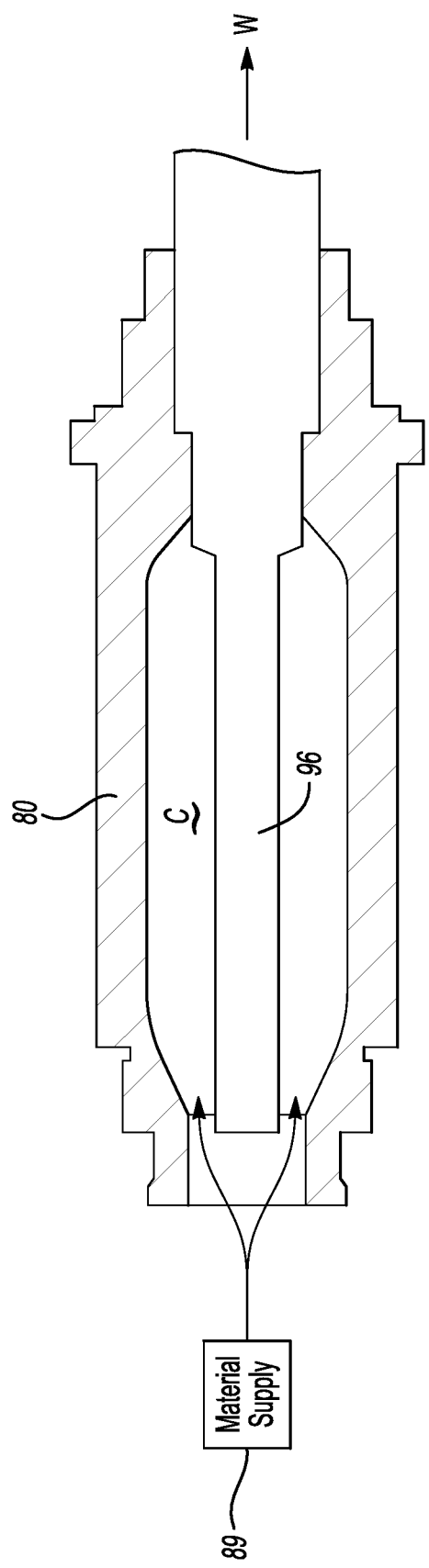
FIG. 6 illustrates a step in an assembling method for the shaft assembly of FIG. 4.

Referring to FIG. 6, with continuing reference to FIG. 5, the insert 76 can be formed within the outer shaft 80 of the shaft assembly 60. In the examples of this disclosure, the insert 76 is shown as a single monolithic structure. The insert 76 could instead be provided by a plurality of separate insert portions.

When forming the insert 76 within the outer shaft 80, molten material from a material supply 89 is injected into a cavity C provided between the outer shaft 80 of the shaft assembly 60 and a die pin 96. The molten material within the cavity C cures to provide the insert 76.

Once cured, the die pin 96 is withdrawn axially along a direction W. The area formerly occupied by the die pin 96 establishes the fluid conduit 84 within the insert 76.

The radial passageways 92 can be formed with a drilling process, for example. Alternatively, the radial passageways 92 could be provided by forming the molten material around pins extending radially through the outer shaft 80 into the cavity C.

After the insert 76 is formed, the retention ring 82 is inserted into the outer shaft 80 of the shaft assembly 60.

In this disclosure, like reference numbers designate like elements where appropriate and reference numerals with the addition of 100 of multiples thereof designate modified elements that are understood to incorporate the same features and benefits of the corresponding original elements.

Figure 7:
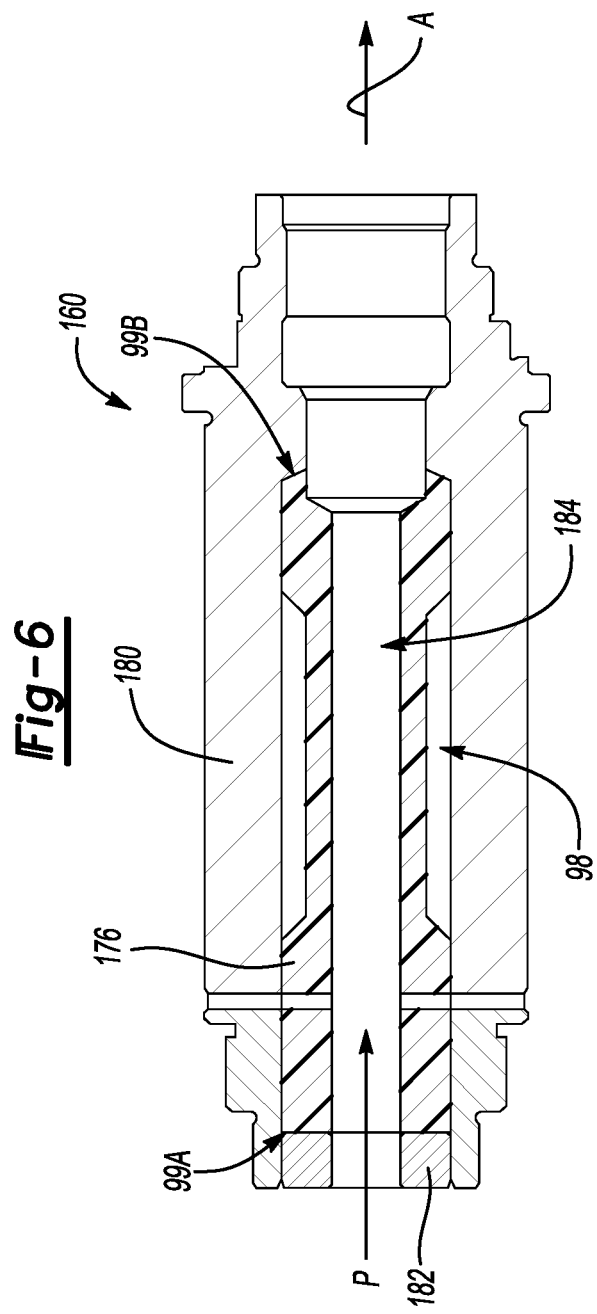
FIG. 7 illustrates a section view of a shaft for the motor of FIG. 2 according to another exemplary embodiment.
Figure 8:
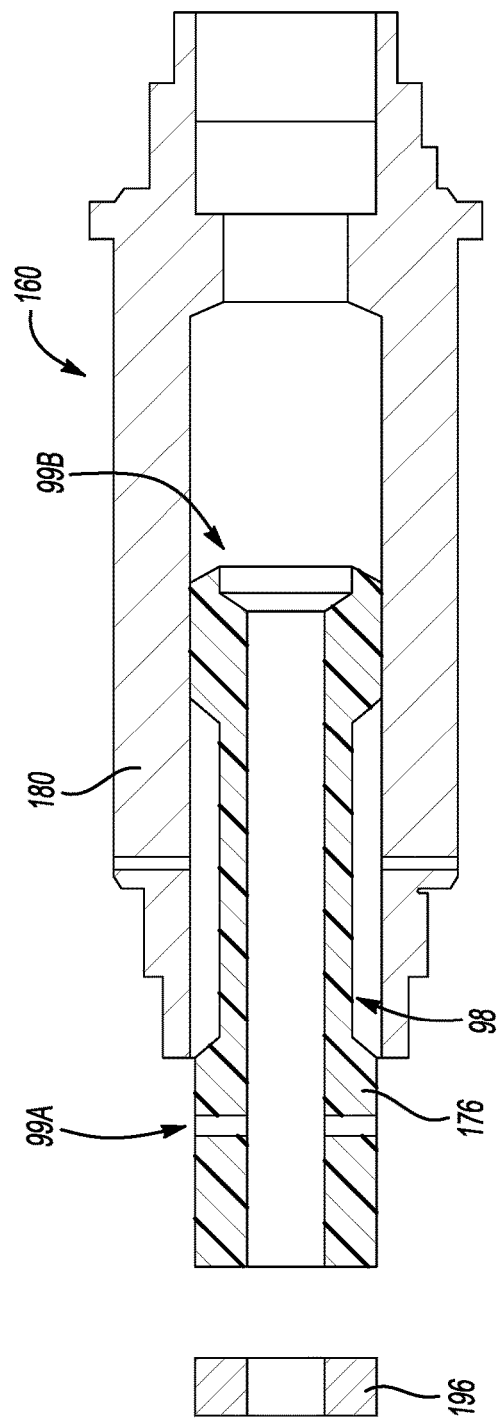
FIG. 8 illustrates a step in an assembling method for the shaft assembly of FIG. 7.

Referring now to FIGS. 7 and 8, a shaft assembly 160 according to another exemplary embodiment includes an insert 176 held within an outer shaft 180. The insert 176 provides a fluid conduit 184.

Assembling the shaft assembly 160 involves sliding the insert 176 along the rotational axis A of the shaft assembly 160 into the outer shaft 180 from the position of FIG. 8 to the position of FIG. 7. A retention ring 182 is then inserted into the outer shaft 180 to hold the insert 176 within the outer shaft 180 and to, optionally, provide a support surface for the shaft assembly 160.

Notably, the insert 176 can be formed independently from the outer shaft 180 and formed prior to insertion within the outer shaft 180. Forming the insert 176 independently from the outer shaft 180 can permit the insert 176 to incorporate more varied geometries as the final geometry is not constrained to the shape of the cavity C (FIG. 6). A density of the insert 176 is less than a density of the outer shaft 180.

Figure 4:
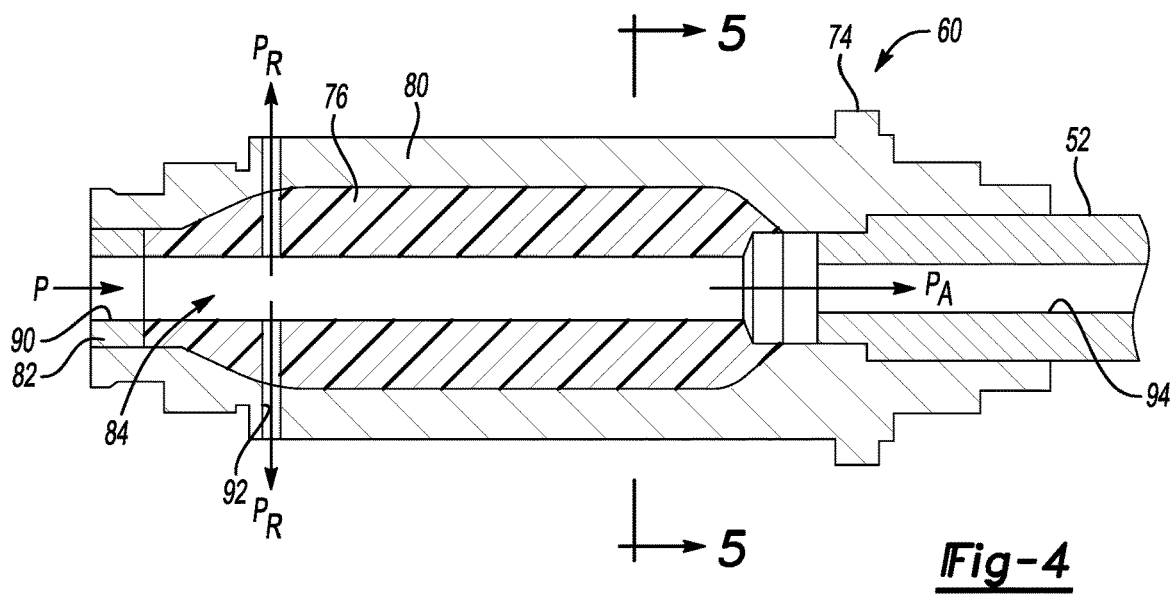
FIG. 4 illustrates a section view at Line 4-4 in FIG. 3 of a shaft assembly of the motor.
Figure 3:
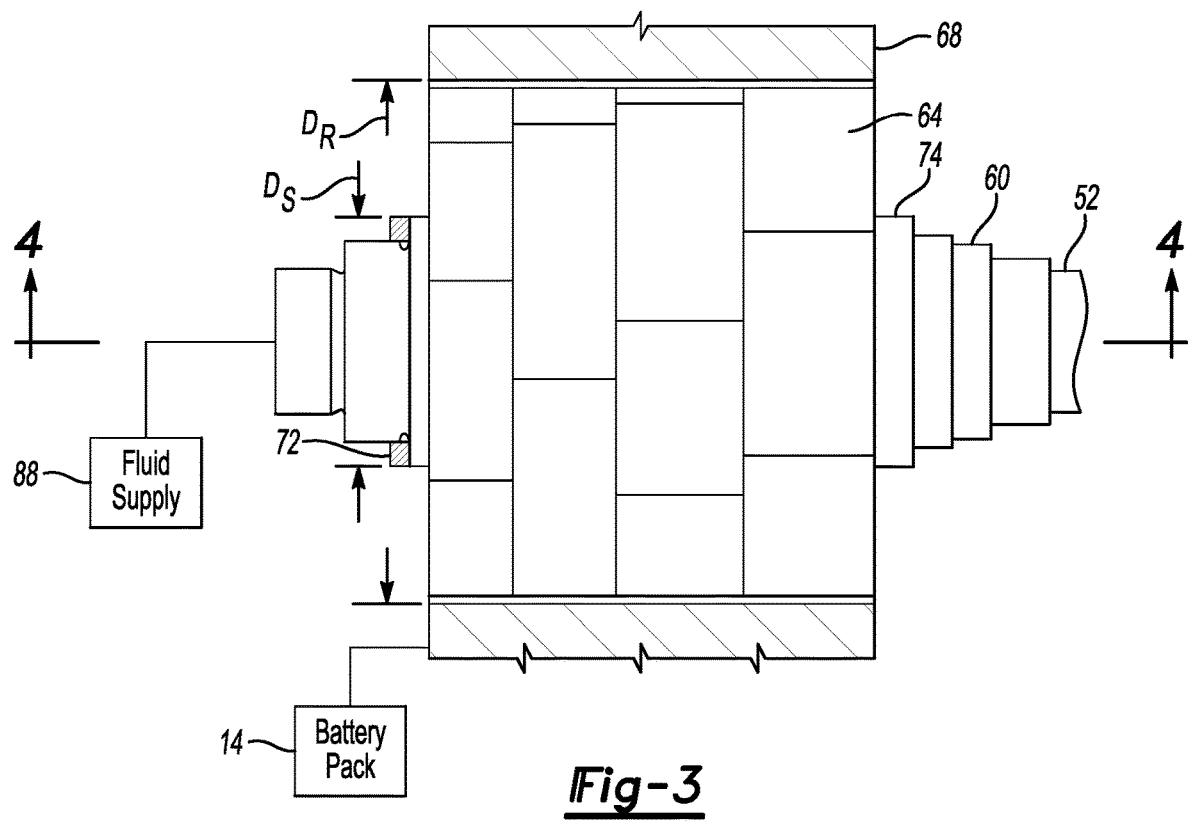
FIG. 3 illustrates a side view of a portion of the motor of FIG. 3 with a stator of the motor sectioned to show a rotor of the motor.

Like the insert 76 of the embodiment of FIGS. 4 to 6, the insert 176 can be formed from a polymer-based material, such as a resin material or a plastic material. The insert 176 could, for example, be a thermoset resin or a molded plastic, like nylon. In some examples, the insert 176 is a composite material, which could include a fibrous material. A composite material could instead, or additionally, be a material filled with additives, such as microballoons, or including pockets of injected air to facilitate decreasing a density of the insert 176. The insert 176 reduces an overall weight of the shaft assembly 160 when compared to a shaft assembly occupying the area of the insert 176 with a metal or metal alloy.

The insert 176 is formed to provide an annular channel 98 about a periphery of the insert 176. As shown, the example insert 176 extends axially from a first end portion 99A to an opposite, second end portion 99B. The first and second end portions 99A, 99B are radially enlarged relative to other portions of the shaft insert 176 to provide the annular channel 98 between the shaft insert and the outer shaft, the annular channel 98 axially between the first and second end portions 99A, 99B. When the insert 176 is positioned within the outer shaft 180 as shown in FIG. 7, the annular channel 98 is positioned radially between a portion of the insert 176 and a portion of the outer shaft 180. The annular channel 98 is an open area where the radially outer perimeter of the insert 176 is spaced from the outer shaft 280. The open area of the annular channel 98 is separated from the fluid conduit 184 by portions of the insert 176 such that fluid flowing in the fluid conduit 184 does not enter the open area of the annular channel 98.

The annular channel 98 can reduce an amount of material required to provide the shaft assembly 160, and additionally reduce an overall weight of the shaft assembly 160 when compared to a shaft assembly that fills the area of the annular channel 98 with a material.

Figure 9:
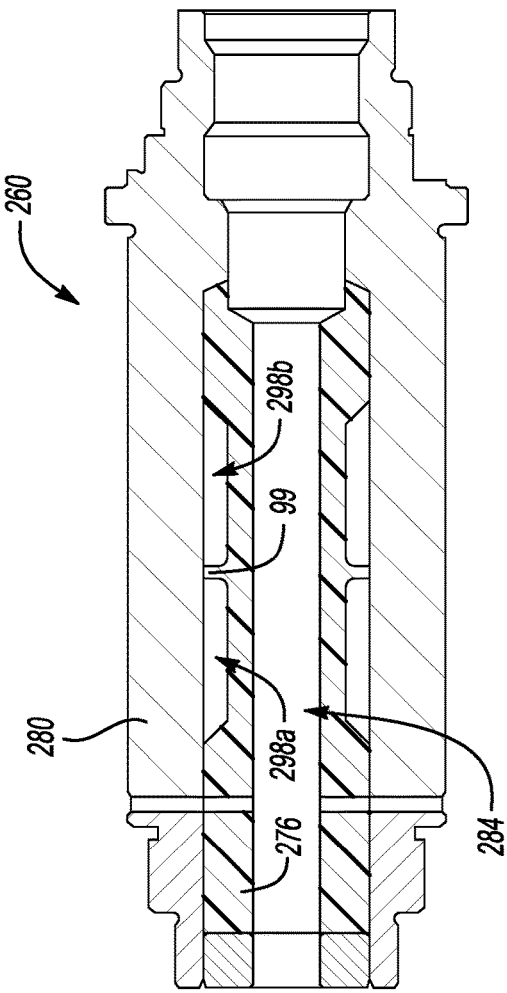
FIG. 9 illustrates a shaft assembly for use in the motor of FIG. 2 according to yet another exemplary embodiment.

Referring now to FIG. 9, yet another example shaft assembly 260 includes an insert 276 received within an outer shaft 280 of the shaft assembly 260. A density of the insert 276 is less than a density of the outer shaft 280. Like the insert 76 of the embodiment of FIGS. 4 to 6, the insert 276 can be formed from a polymer-based material, such as a resin material or a plastic material. The insert 276 could, for example, be a thermoset resin or a molded plastic, like nylon. In some examples, the insert 276 is a composite material, which could include a fibrous material. A composite material could instead, or additionally, be a material filled with additives, such as microballoons, or including pockets of injected air to facilitate decreasing a density of the insert 276. The insert 276 reduces an overall weight of the shaft assembly 260 when compared to a shaft assembly occupying the area of the insert 276 with a metal or metal alloy. The insert 276 provides a fluid conduit 284.

The shaft assembly 260 includes two annular channels 298a and 298b separated by a radially extending rib 99 of the insert 276. The rib 99 directly contacts the outer shaft 280 of the shaft assembly 260. The rib 99 is a single rib in this example. In other examples, the rib 99 could be one of a series of one or more separate ribs. The annular channels 298a and 298b are open areas where the radially outer perimeter of the insert 276 is spaced from the outer shaft 280. The open area of the annular channels 298a and 298b are separated from the fluid conduit 184 by portions of the insert 276 such that fluid flowing in the fluid conduit 284 does not enter the open area of the annular channels 298a and 298b.

The rib 99 can facilitate supporting the insert 276 within the outer shaft 280 such that the areas of the insert 276 providing the annular channels 298a and 298b do not flex radially relative to the outer shaft 280. The rib 99, or ribs, can prevent significant radially outward deflections of the insert 276 under high centrifugal forces when the shaft assembly 260 is rotating at relatively high speeds.

Figure 10:
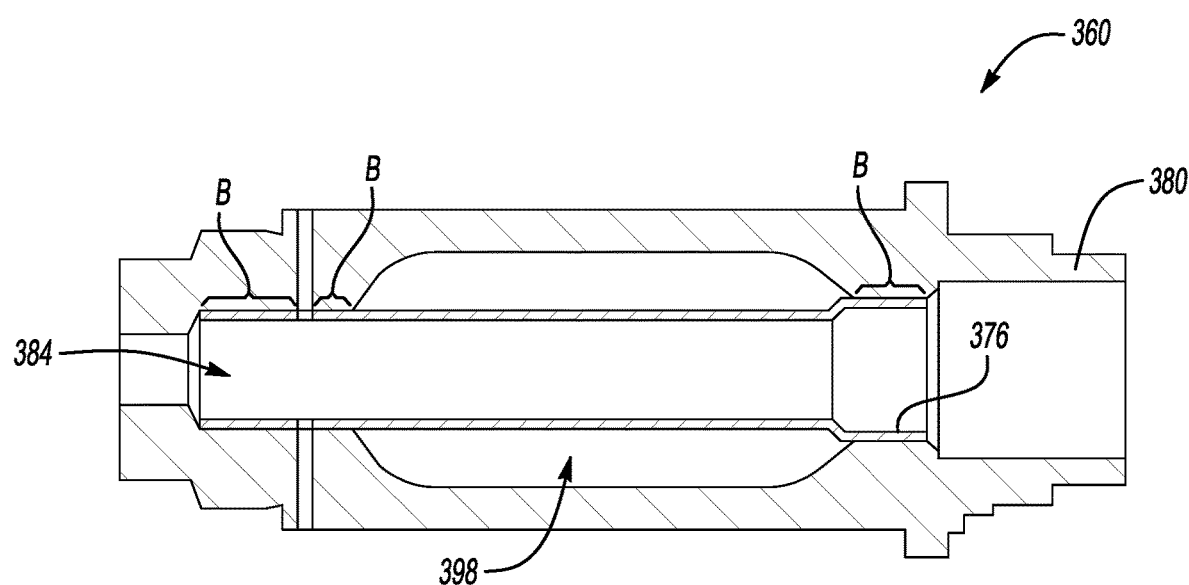
FIG. 10 illustrates a shaft assembly for use in the motor of FIG. 2 according to yet another exemplary embodiment.

Referring now to FIG. 10, yet another example shaft assembly 360 includes an insert 376 received within an outer shaft 380 of a shaft assembly 360. The insert 376, in this exemplary embodiment, is a tube of a metal or metal alloy. The insert 376 provides a fluid conduit 384.

The insert 376 is formed to provide an annular channel 398 about a periphery of the insert 376. When the insert 376 is positioned within the outer shaft 380 as shown in FIG. 10, the annular channel 398 is positioned radially between a portion of the insert 376 and a portion of the outer shaft 380. The annular channel 398 is an open area where the radially outer perimeter of the insert 376 is spaced from the outer shaft 380. The open area of the annular channel 398 is separated from the fluid conduit 384 by portions of the insert 376 such that fluid flowing in the fluid conduit 384 does not enter the open area of the annular channel 398.

The annular channel 398 can reduce an amount of material required to provide the shaft assembly 360, and additionally reduce an overall weight of the shaft assembly 360 when compared to a shaft assembly that fills the area of the annular channel 398 with a material.

Areas B where the insert 376 contacts the outer shaft 380 can include an adhesive to bond the insert 376 to the outer shaft 380 and to seal the annular channel 398 from fluid moved through the fluid conduit 384 provided by the insert 376. The insert 376 could instead, or additionally, be crimped or mechanically secured to the outer shaft 380. In such cases a seal, like an o-rings or a polymer/adhesive seal, could be used to seal the annular channel 398 from fluid moved through the fluid conduit 384.

A feature of the disclosed embodiments can include incorporating an insert into a shaft assembly to provide a fluid conduit and to reduce an overall weight of the shaft assembly. In some examples, the insert can reduce a weight of a shaft assembly by up to 25 percent when compared to a shaft assembly lacks an insert and provides a fluid conduit with an outer shaft.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An electrified vehicle assembly, comprising:
an outer shaft that is rotatable about an axis, the outer shaft rotatably couples a motor of an electrified vehicle with a transmission component of the electrified vehicle; and
a shaft insert that provides a conduit for a fluid and that blocks the fluid from flowing radially between the shaft insert and the outer shaft relative to the axis, the shaft insert includes a polymer-based material, a composite material, or both,
wherein the shaft insert extends axially from a first end portion to an opposite, second end portion, wherein the first and second end portions are radially enlarged relative to other portions of the shaft insert to provide an annular channel between the shaft insert and the outer shaft, the annular channel axially between the first and second end portions.

2. The electrified vehicle assembly of claim 1, wherein the shaft insert is slideably received within the outer shaft.

3. The electrified vehicle assembly of claim 1, wherein portions of the shaft insert are radially spaced from the outer shaft to provide at least one annular cavity between the shaft insert and the outer shaft relative to the axis.

4. The electrified vehicle assembly of claim 1, wherein a material composition of the shaft insert has a lower density than a material composition of the outer shaft.

5. The electrified vehicle assembly of claim 1, further comprising at least one vehicle drive wheel, wherein the motor is configured to rotate the shaft to drive the at least one vehicle drive wheel through the transmission component.

6. The electrified vehicle assembly of claim 1, wherein the outer shaft is a metal or metal alloy.

7. An electrified vehicle shaft providing method, comprising:
    positioning a shaft insert within an outer shaft, the shaft insert having a fluid conduit and configured to block fluid from communicating radially between the shaft insert and the outer shaft, wherein the shaft insert includes a polymer-based material, a composite material, or both; and
    rotatably coupling together a motor of an electrified vehicle to a transmission component of an electrified vehicle using the outer shaft,
    wherein the shaft insert extends axially from a first end portion to an opposite, second end portion, wherein the first and second end portions are radially enlarged relative to other portions of the shaft insert to provide an annular channel between the shaft insert and the outer shaft, the annular channel axially between the first and second end portions.

8. The electrified vehicle shaft providing method of claim 7, further comprising inserting the shaft insert as a molded component into the outer shaft.

9. The electrified vehicle shaft providing method of claim 7, further comprising radially spacing portions of the shaft insert from the outer shaft to provide at least one annular cavity between the shaft insert and the outer shaft relative to the axis.

10. The electrified vehicle shaft providing method of claim 7, further comprising driving the transmission component with the outer shaft to drive at least one vehicle drive wheel of the electrified vehicle.

11. The electrified vehicle shaft providing method of claim 10, further comprising rotating the outer shaft to drive the transmission component, and driving the motor to rotate the outer shaft.

12. The electrified vehicle shaft providing method of claim 7, wherein the outer shaft is a metal or metal alloy.

13. An electrified vehicle assembly, comprising:
    an outer shaft that is rotatable about an axis, the outer shaft rotatably couples a motor of an electrified vehicle with a transmission component of the electrified vehicle; and
    a shaft insert that provides a conduit for a fluid, the conduit extending from a first axial end of the conduit to an opposite, second axial end of the conduit, the conduit configured to block fluid that has not passed through at least a portion of the conduit from flowing radially between the shaft insert and the outer shaft relative to the axis, the shaft insert includes a polymer-based material, a composite material, or both,
    wherein the shaft insert extends axially from a first end portion to an opposite, second end portion, wherein the first and second end portions are radially enlarged relative to other portions of the shaft insert to provide an annular channel between the shaft insert and the outer shaft, the annular channel axially between the first and second end portions.

* * * * *